United States Patent
Huang et al.

(10) Patent No.: US 11,238,607 B2
(45) Date of Patent: Feb. 1, 2022

(54) SYSTEM AND METHOD FOR MEASURING THE ACCURACY OF AN ELECTRONIC MAP OR A LOCALIZATION OF A VEHICLE

(71) Applicant: Denso International America, Inc., Southfield, MI (US)

(72) Inventors: Minglei Huang, Novi, MI (US); Hiroshi Inou, West Bloomfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/835,592

(22) Filed: Mar. 31, 2020

(65) Prior Publication Data
US 2021/0304433 A1 Sep. 30, 2021

(51) Int. Cl.
G06K 9/00 (2006.01)
G06T 7/64 (2017.01)
G01S 19/39 (2010.01)
G01C 21/30 (2006.01)

(52) U.S. Cl.
CPC .............. G06T 7/64 (2017.01); G01C 21/30 (2013.01); G01S 19/393 (2019.08); G06K 9/00798 (2013.01); *G06T 2207/30241* (2013.01); *G06T 2207/30256* (2013.01)

(58) Field of Classification Search
CPC combination set(s) only.
See application file for complete search history.

(56) References Cited

U.S. PATENT DOCUMENTS

| | | | |
|---|---|---|---|
| 6,560,531 B1 * | 5/2003 | Joshi ................. | G01C 21/30 340/988 |
| 7,024,307 B2 | 4/2006 | Ito et al. | |
| 2009/0144030 A1 * | 6/2009 | Witmer ............... | G01C 21/32 703/1 |
| 2010/0208937 A1 * | 8/2010 | Kmiecik .............. | G01C 21/32 382/100 |
| 2014/0095062 A1 * | 4/2014 | Wang ................. | G01C 21/32 701/409 |

(Continued)

FOREIGN PATENT DOCUMENTS

| | | |
|---|---|---|
| JP | 2007219368 A | 8/2007 |
| JP | 2011503563 A | 1/2011 |
| WO | 2019127074 A1 | 7/2019 |

*Primary Examiner* — Shervin K Nakhjavan
(74) *Attorney, Agent, or Firm* — Christopher G. Darrow; Darrow Mustafa PC

(57) ABSTRACT

A system for measuring accuracy of an electronic map or a localization of a vehicle may include one or more processors and a memory in communication with the one or more processors having an image capture module, a ground truth generating module, a curve function generating module, and an accuracy determining module. These modules contain instructions that when executed by the one or more processors causes the processors to obtain sensor data that includes images of one or more road lane markings of a road or trajectory data regarding the trajectory of the vehicle, determine ground truth curvature values, perform a curve fitting of map lane marking points or map trajectory points, and compare curvature values of a curve function generated by the curve fitting to the ground truth curvature values to determine the accuracy the electronic map or the localization of the vehicle.

18 Claims, 6 Drawing Sheets

(56) References Cited

U.S. PATENT DOCUMENTS

| | | | |
|---|---|---|---|
| 2014/0236482 A1* | 8/2014 | Dorum | G01C 21/34 701/533 |
| 2018/0304891 A1 | 10/2018 | Heidenreich et al. | |
| 2018/0373941 A1* | 12/2018 | Kwant | G08G 1/0129 |
| 2020/0158516 A1* | 5/2020 | Gale | G01C 21/32 |
| 2020/0166364 A1* | 5/2020 | Fujita | G01S 19/14 |
| 2020/0225044 A1* | 7/2020 | Tohriyama | G05D 1/0212 |
| 2020/0398856 A1* | 12/2020 | Giurgiu | B60W 40/072 |
| 2020/0400439 A1* | 12/2020 | Thompson | G01C 21/30 |

* cited by examiner

SYSTEM AND METHOD FOR MEASURING THE ACCURACY OF AN ELECTRONIC MAP OR A LOCALIZATION OF A VEHICLE

TECHNICAL FIELD

The subject matter described herein relates, in general, to systems and methods for measuring the accuracy of an electronic map or a localization of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles have autonomous or semi-autonomous capabilities that allow the vehicle to pilot itself with varying degrees of autonomy. In the case of an autonomous vehicle, a vehicle can essentially pilot itself with little to no human input. With regard to semi-autonomous vehicles, these vehicles generally assist the human operator with piloting the vehicle. In some cases, semi-autonomous systems may take control of the vehicle depending on the circumstances, such as an impending collision.

Some autonomous and semi-autonomous vehicle control systems utilize electronic maps along with other vehicle systems and subsystems, such as sensors, that can perceive the environment around the vehicle. Generally, determining if these electronic maps are accurate is a painstakingly difficult proposition that requires significant resources, both human and computational. Another important determination regarding accuracy concerns the localization of a vehicle. Moreover, the localization of a vehicle are methods for determining the location of the vehicle in a two-dimensional or three-dimensional space. Like with electronic maps, the accuracy of the location of the vehicle is important for autonomous and/or semi-autonomous driving applications.

SUMMARY

This section generally summarizes the disclosure and is not a comprehensive explanation of its full scope or all its features.

In one embodiment, a system for measuring the accuracy of an electronic map or a localization of a vehicle may include one or more processors and a memory in communication with the one or more processors. The memory may include an image capture module, a ground truth generating module, a curve function generating module, and an accuracy determining module. The image capture module may include instructions that, when executed by the one or more processors, cause the one or more processors to obtain sensor data captured by a sensor mounted to a vehicle and location data of the vehicle. The sensor data may include one or more images of one or more road lane markings of a road or trajectory data regarding the trajectory of the vehicle.

The ground truth generating module may include instructions that, when executed by the one or more processors, cause the one or more processors to determine ground truth curvature values of the road lane markings based on the sensor data and the location data or ground truth curvature values of the trajectory of the vehicle based on the trajectory data from the sensor and trajectory points from a global navigation satellite system (GNSS). The curve function generating module may include instructions that, when executed by the one or more processors, cause the one or more processors to determine a curve function by performing a curve fitting of map lane marking points of the road or map trajectory points of the road. The curve function generating module may include instructions that, when executed by the one or more processors, cause the one or more processors to determine curvature values of the curve function.

The accuracy determining module may include instructions that, when executed by the one or more processors, cause the one or more processors to compare the curvature values of the curve function to the ground truth curvature values to generate a difference output. The difference output may indicate the accuracy of the electronic map or the localization of the vehicle.

In another embodiment, a method for measuring the accuracy of an electronic map may include the steps of obtaining sensor data captured by a sensor mounted to a vehicle and location data of the vehicle, determining ground truth curvature values of the road lane markings based on the sensor data and the location data, determining a curve function by performing a curve fitting of the map lane marking points of the road, determining curvature values of the curve function, and comparing the curvature values of the curve function to the ground truth curvature values to generate a difference output. The sensor data may include one or more images of one or more road lane markings of a road. The difference output may indicate the accuracy of the electronic map.

In yet another embodiment, a method measuring the accuracy of a localization of a vehicle may include the steps of obtaining sensor data captured by a sensor mounted to a vehicle and location data of the vehicle, obtain map trajectory points of the road of the electronic map, determining ground truth curvature values of the trajectory of the vehicle based on the trajectory data and the location data, determining a curve function by performing a curve fitting of the map trajectory points of the road, determining curvature values of the curve function, and comparing the curvature values of the curve function to the ground truth curvature values to generate a difference output. The difference output may indicate the accuracy of the localization of the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A system and method for determining the accuracy of an electronic map may obtain sensor data, in the form of one or more images captured by one or more cameras, as well as location data to generate ground truth curvature values of road lane markings. These road lane markings may be in the form of lines located in the middle of or towards the outside of one or more roads. The system also may obtain map lane marking points of the road from the electronic map. The system generates a curve function and, therefore, curvature values by performing a curve fitting of the map lane marking points of the road. Thereafter, the system compares the curvature values of the curve function to the ground truth curvature values previously determined. Differences between the two indicate the overall accuracy of the electronic map.

The accuracy of the localization of a vehicle can be determined in a similar way. Moreover, the system obtains sensor data, in the form of one or more images captured by a camera and data from a global navigation satellite system (GNSS). The trajectory data from the sensor data and trajectory points from the GNSS can be used to generate ground truth curvature values of the trajectory of the vehicle. The system may also obtain map trajectory points from the electronic map and generate curvature values by performing a curve fitting of the map trajectory points. Thereafter, the curvature values of the curve function and the ground truth values are compared to generate a difference output. The difference output indicates the accuracy of the localization of the vehicle.

Figure 1:
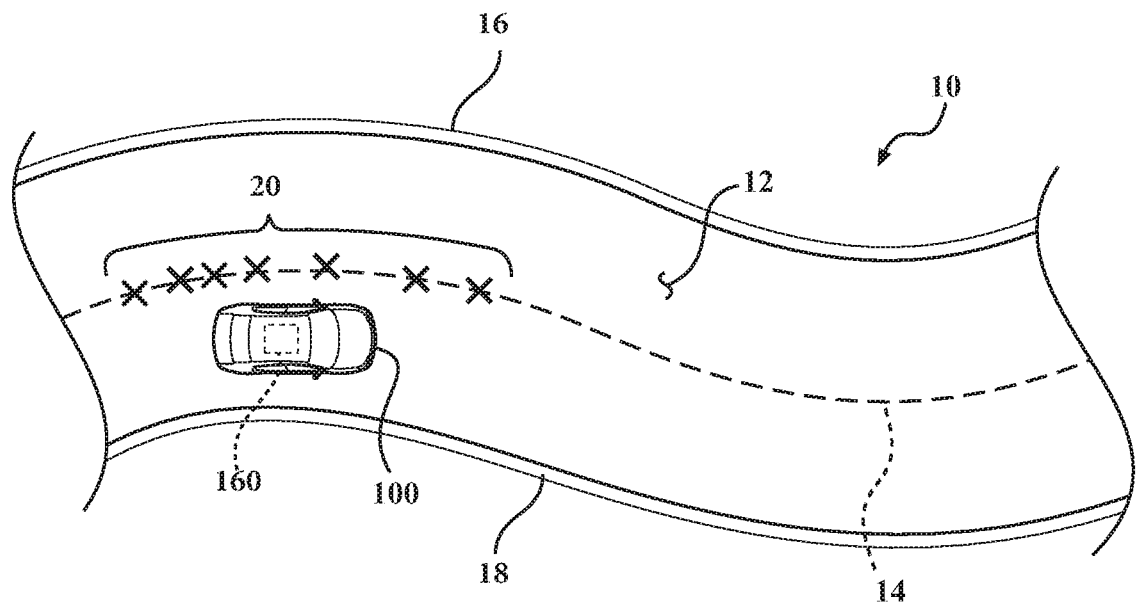
FIG. 1 illustrates an example of a vehicle incorporating the system for determining accuracy operating on a road.

Referring to FIG. 1, an example 10 of a road 12 having a vehicle 100 traveling thereon is shown. The road 12 includes a plurality of road lane markings 14 in the form of centerlines of the road 12. Generally, the road lane markings 14 may be in a number of different forms, such as perimeter road markings 16 and 18 that generally mark the perimeter of the road 12. However, the road lane markings may take any one of several different forms and not necessarily those described above. As such, road lane markings could be any permanent and/or semi-permanent marking on the road to assist with the direction, flow, and/or location of motorized vehicles and/or pedestrians when using the road. Traveling on the road 12 is a vehicle 100 incorporating a accuracy measuring system 160 for measuring the accuracy of an electronic map and/or the accuracy of the localization of the vehicle 100.

As will be explained later in this specification, the accuracy measuring system 160 can determine the accuracy of an electronic map and/or the accuracy of the localization of the vehicle 100. Moreover, to provide a brief introductory overview, the accuracy measuring system 160 may generate ground truth curvature values of the road lane markings 14 based on sensor data. The sensor data may be captured by a sensor in the form of a camera that captures images of the road lane markings 14. Using this information, ground truth curvature values can be generated based on this data.

Figure 2:
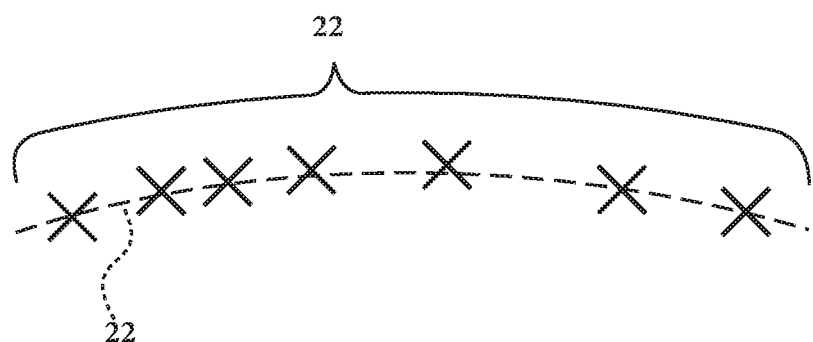
FIG. 2 illustrates an example comparing ground truth curvature values to curvature values of a curve function.

For example, referring to FIG. 2, shown are ground truth curvature values 20 as a series of X's generated from the road lane markings 14 of FIG. 1. Map lane marking points from an electronic map has been utilized to generate a curve function 22 by performing a curve fitting of the map lane marking points of the road. A comparison of the curvature values of the curve function 22 can be made to the lane marking points 20 to generate a difference, which can indicate the accuracy of the electronic map.

The same can also be true for determining the accuracy of the localization of the vehicle 100. Moreover, sensor information obtained by a sensor in the form of a camera can be utilized to determine the trajectory of the vehicle 100 Along with trajectory points of the vehicle 100 gathered from a GNSS. Ground truth curvature values of the trajectory of the vehicle can be generated using the sensor data, and the trajectory points from the GNSS system. A curve fitting function that can generate curvature values can be generated by performing a curve fitting of map trajectory points of the road from the electronic map. Thereafter, a comparison between the differences of the curvature values of the curve function to the ground truth curvature values can be performed to indicate the overall accuracy of the localization of the vehicle 100.

Figure 3:
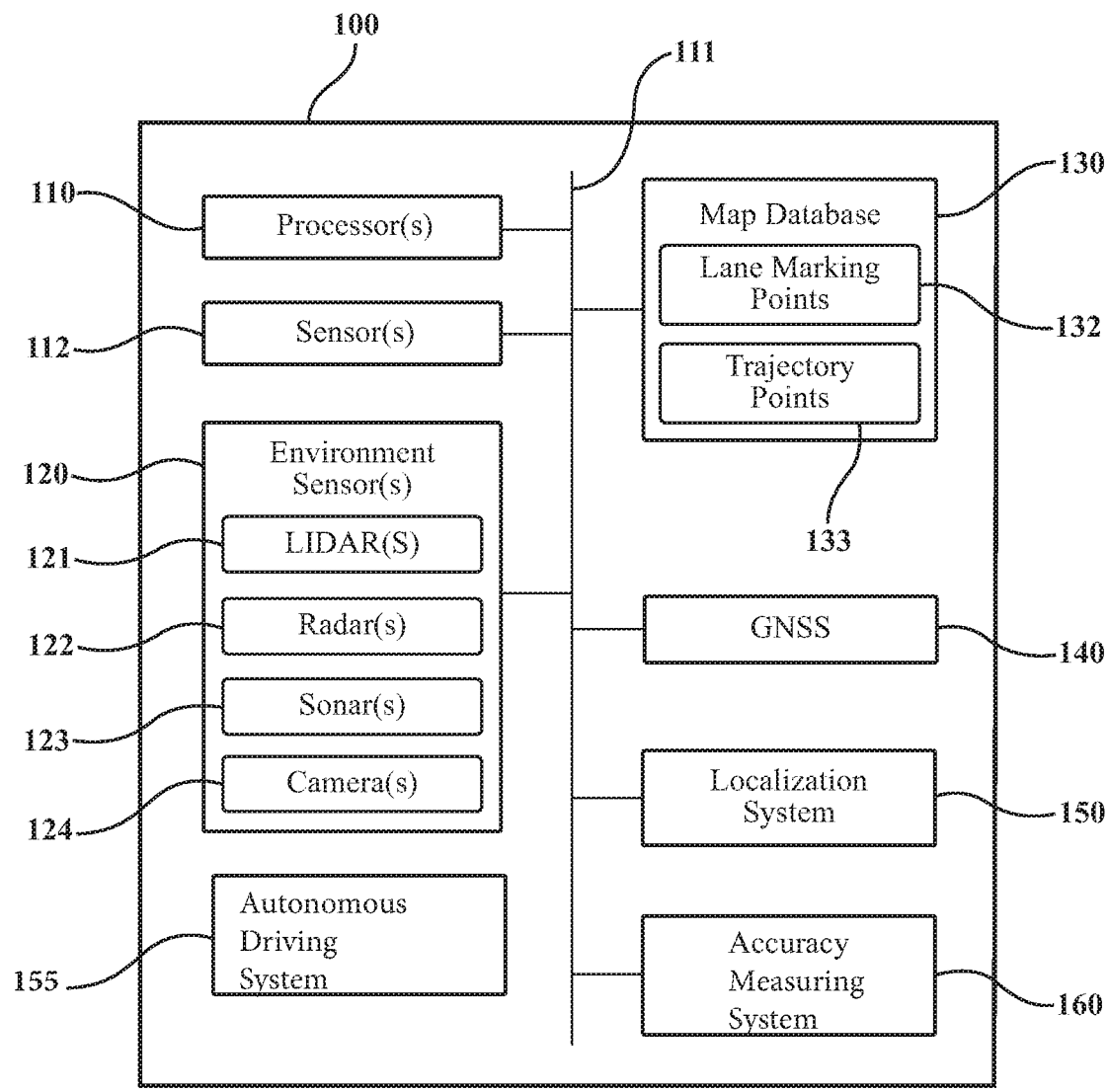
FIG. 3 illustrates a more detailed illustration of a vehicle incorporating the accuracy measuring system.

Referring to FIG. 3, an example of the vehicle 100 of FIG. 1 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport that, for example, transports occupants, and thus benefits the functionality discussed herein. Additionally, the vehicle 100 could be an autonomous vehicle, a semi-autonomous vehicle, a nonautonomous vehicle, or combinations thereof.

The vehicle 100 also includes various elements. It will be understood that in various embodiments, the vehicle 100 may not have all the elements shown in FIG. 3. The vehicle 100 can have different combinations of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

In any case, the vehicle 100 may include one or more processor(s) 110. The processor(s) 110 may be located within the vehicle 100 or may be located external to the vehicle 100 and may assist and/or perform the processing any of the methods disclosed in this specification. The processor(s) 110 may be connected to one or more data buses 111 that allow the processor(s) 110 to communicate with one or more vehicle systems. For example, the processor(s) 110 may have the ability to communicate with one or more vehicle sensors, such as vehicle sensors 112, that may include several different sensors for measuring any one of several different variables. For example, the vehicle sensors 112 can include sensors regarding acceleration, steering wheel angle, velocity, and other forces acting on or generated by the vehicle 100.

The vehicle 100 may also include several environment sensors 120. The environment sensors 120 are capable of detecting objects or perform other measurements of the environment that surrounds the vehicle 100. For example, the environment sensors 120 could include LIDAR sensor(s) 121, radar sensor(s) 122, sonar sensor(s) 123, and camera(s) 124. The purpose of the sensors making up the environment sensors 120 is to detect objects and/or the environment external to the vehicle 100.

The vehicle 100 may also include an electronic map database 130 that may include an electronic map of one or more roads that the vehicle 100 that the vehicle may travel upon. The electronic map database 130 may include high definition maps (HD maps) that may be detailed down to the centimeter scale. As such, HD maps may provide information about lane placement, road boundaries, the severity of curves, the gradient of the road, etc. Some of this information could include lane marking points 132 to indicate the markings of one or more lanes, such as the centerline of a lane and/or the perimeter of lanes, etc. Furthermore, the electronic map database 130 may also include trajectory points 133 that generally indicate the trajectory of one or more roads.

The vehicle 100 may also include a global navigation satellite system (GNSS) 140 that can receive signals from satellites and determine the approximate location of the vehicle 100. Anyone of several different GNSS systems may be utilized, such as Global Position System (GPS), Galileo, GLONASS, Beidou, and the like. The GNSS may provide information regarding the location of the vehicle 100, the trajectory of the vehicle 100, timestamp information, and the like. The GNSS 140 may also be able to utilize this information to determine the speed, acceleration, trajectory, elevation, and other details regarding the activity and/or location of the vehicle 100.

As such, the vehicle 100 may include a localization system 150 that is able to determine the location of the vehicle in a two dimensional and/or three-dimensional space. The localization system may utilize information from the GNSS 140 as well as from the vehicle sensors 112 and/or the environment sensors 120 to determine the location of the vehicle 100.

The vehicle may also include an autonomous driving module 155 that can pilot the vehicle 100 in an autonomous manner to a destination. In order to do this, the autonomous driving module may use information from the vehicle sensors 112, the environment sensors 120, the electronic map database 130, the GNSS 140, and/or the localization system 150 to pilot the vehicle 100 to one or more destinations in a safe manner. However, in order to safely pilot the vehicle 100 to one or more destinations, map information contained within the electronic map database 130 should be accurate. Furthermore, the localization system 150 of the vehicle 100 should also be accurate. As such, the vehicle 100 may also include an accuracy measuring system 160 that can measure the accuracy of the electronic map database 130 and/or the localization system 150 of the vehicle 100.

Figure 4:
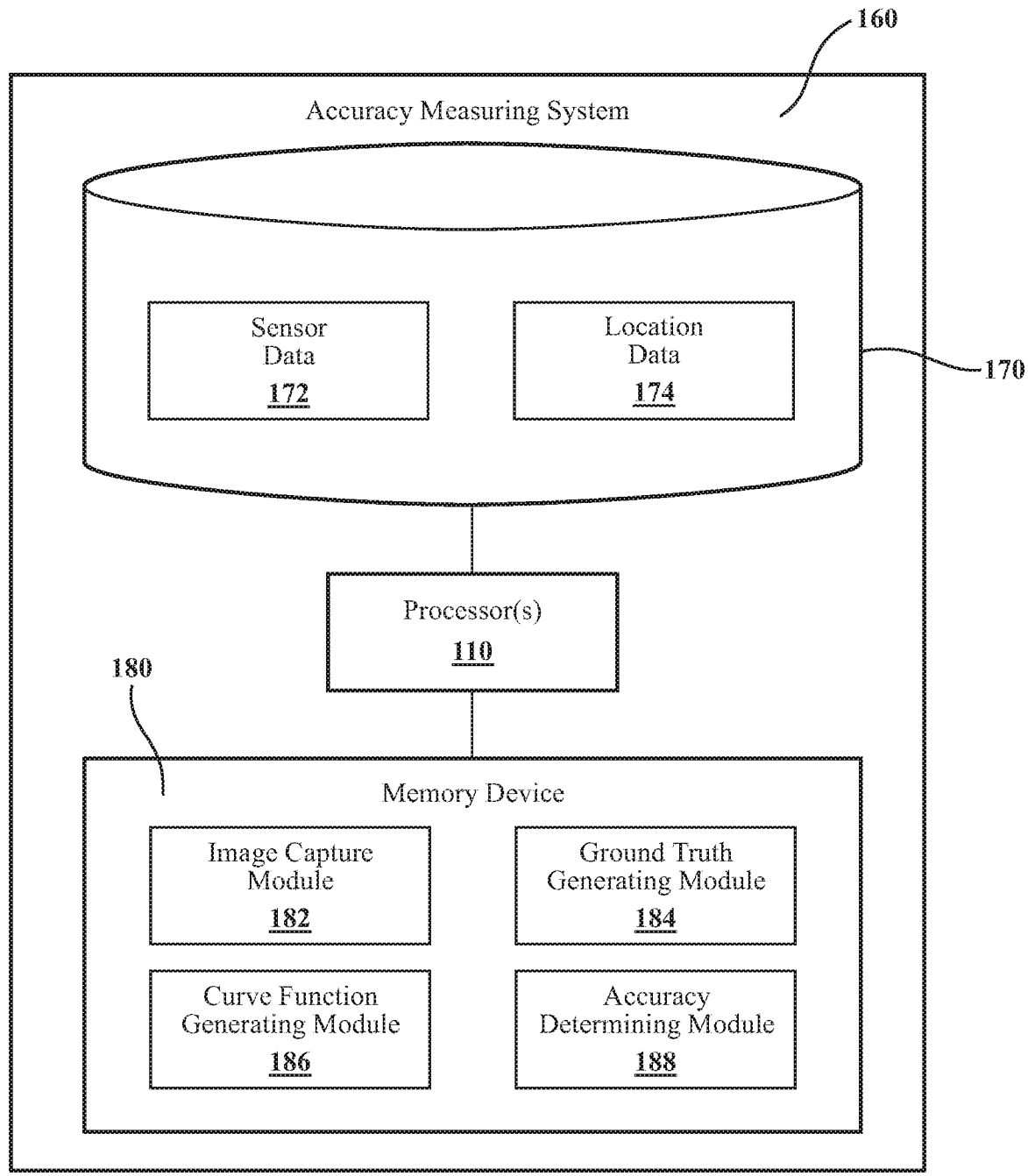
FIG. 4 illustrates a more detailed view of the accuracy measuring system.

With reference to FIG. 4, a more detailed illustration of the accuracy measuring system 160 is shown. As shown, the accuracy measuring system 160 includes a processor(s) 110. Accordingly, the processor(s) 110 may be a part of the accuracy measuring system 160, or the accuracy measuring system 160 may access the processor(s) 110 through the data buses 111 or another communication pathway. In one or more embodiments, the processor(s) 110 is an application-specific integrated circuit that is configured to implement functions associated with an image capture module 182, a ground truth generating module 184, a curve function generating module 186, and/or an accuracy determining module 188. More generally, in one or more aspects, the processor(s) 110 is an electronic processor, such as a microprocessor that can perform various functions as described herein when loading the modules 182-188 and executing encoded functions associated therewith.

In this example, the accuracy measuring system 160 is disposed within the vehicle 100. However, the accuracy measuring system 160 may be disposed of in other devices that can transmit and/or receive messages. For example, the accuracy measuring system 160 may be located remote from the vehicle 100 and may simply receive information from the vehicle 100. Upon receiving information from the vehicle 100, the accuracy measuring system 160 may perform any one of the methods described in this specification to determine the accuracy of an electronic map and/or the localization of a vehicle.

In one embodiment, the accuracy measuring system 160 includes a memory 180 that stores the image capture module 182, the ground truth generating module 184, the curve function generating module 186, and/or the accuracy determining module 188. The memory 180 may be a random-access memory (RAM), read-only memory (ROM), a hard disk drive, a flash memory, or other suitable memory for storing the modules 182-188. The modules 182-188 are, for example, computer-readable instructions that, when executed by the processor(s) 110, cause the processor(s) 110 to perform the various functions disclosed herein. While, in one or more embodiments, the modules 182-188 are instructions embodied in the memory 180, in further aspects, the modules 182-188 include hardware, such as processing components (e.g., controllers), circuits, etc. for independently performing one or more of the noted functions.

Furthermore, in one embodiment, the accuracy measuring system 160 includes a data store 170. The data store 170 is, in one embodiment, an electronically based data structure for storing information. In at least one approach, the data store 170 is a database that is stored in the memory 180 or another suitable medium, and that is configured with routines that can be executed by the processor(s) 110 for analyzing stored data, providing stored data, organizing stored data, and so on. In either case, in one embodiment, the data store 170 stores data used by the modules 182-188 in executing various functions. In one embodiment, the data store 170 may be able to store sensor data 172 collected the vehicle sensors 112 and/or the environment sensors 120. The data store 170 may also be able to store location data 174 collected from the GNSS 140.

Accordingly, the image capture module 182 may include instructions that, when executed by the processor(s) 110 cause the processor(s) 110 to obtain sensor data captured by a sensor mounted to the vehicle 100. In one example, the sensor data may be in the form of camera data captured by the camera(s) 124 of the vehicle 100. The camera data may be one or more images captured of the environment in which the vehicle 100 is operating in. Moreover, in the example shown in FIG. 1, the camera(s) 124 may capture images of the road 12 that may include one or more road lane markings 14 of the road 12. Additionally or alternatively, the sensor data could include trajectory data regarding the trajectory of the vehicle 100. Moreover, trajectory data can be generated from images of the road lane markings 14 of the road 12.

Mention should also be made regarding the use of different coordinate systems when determining the accuracy of the electronic map or the localization of the vehicle. When determining the accuracy of the electronic map, the position of the vehicle 100 collected from the GNSS 140 is utilized as the coordinate system. As such, information from the electronic map is transferred from the map coordinate system, which may be WGS84, to the local coordinate system of the vehicle position as collected from the GNSS 140. When determining the accuracy of the location of the vehicle, the opposite is performed. Moreover, when determining the accuracy of the vehicle 100, the coordinate system of the electronic map, which may be WGS84, is utilized.

The ground truth generating module 184 may include instructions that, when executed by the processor(s) 110, causes the processor(s) 110 to determine ground truth curvature values of the road lane markings 14 based on the sensor data and location data. Location data may be generated from the GNSS 140. In one example, the ground truth generating module 184 may also include instructions that cause the processor(s) 110 to determine initial location values of the lane markers based on the sensor data and the location data. The initial locations may then be offset by offset values to generate actual location values. The offset values generally represent a difference between the vehicle 100 and the road lane markings 14. Directional values of the actual location values may then be determined by taking a directional derivative of the actual location values. Ground truth curvature values may be generated by taking a derivative of the directional values previously calculated.

Alternatively or additionally, the ground truth generating module 184 may determine ground truth curvature values of the trajectory of the vehicle 100 based on trajectory data from the sensors and trajectory points from the GNSS 140. Similarly, in this variation, the ground truth generating module 184 may determine the ground truth curvature values by determining initial location values of road lane markings 14 based on the sensor data, offsetting the initial locations of the road lane markings 14 by offset values to generate actual location values, determining direction values of the actual location values by taking a directional derivative of the actual location values and then finally determining the ground truth curvature values by taking a derivative of the direction values.

The ground truth generating module 184 may determine ground truth curvature values in order to measure the accuracy of the electronic map or to determine the accuracy of the localization of the vehicle. In order to determine the accuracy of the electronic map, the ground truth generating module 184 determines ground truth curvature values by determining the curvature of the lane markings detected by the sensor. With regards to vehicle localization, the ground truth curvature values relate to the curvature of the trajectory that the vehicle 100 drives on the road 12.

The curve function generating module 186 may include instructions that, when executed by the processor(s) 110, causes the processor(s) 110 to determine a curve function by performing a curve fitting operation. The curve fitting may be a polynomial curve fitting type operation. In one example, the curve fitting may be a curve fitting of map lane marking points of the road from the electronic map, such as found in the electronic map database 130. In order to perform an appropriate comparison to determine accuracy, the map lane marking points of the electronic map should generally correspond to the road lane markings 14 captured by the sensor. Here, the curve function generating module 186 causes the processor(s) 110 to perform a curve fitting operation of the map lane marking points of the electronic map. After the curve fitting operation is complete, and a curve function is generated, curvature values of the curve function can be generated. Alternatively or additionally, instead of performing a curve fitting of map lane marking points, a curve fitting of map trajectory points may be utilized instead. Curve fitting of the map trajectory points is utilized to determine the accuracy of the localization of the vehicle 100, while the curve fitting of the map lane marking points of the electronic map is utilized to determine the accuracy of the electronic map.

The accuracy determining module 188 includes instructions that, when executed by the processor(s) 110, causes the processor(s) 110 to compare the curvature values of the curve function to the ground truth curvature values to generate a difference output. The difference output generally indicates the accuracy of either the electronic map or the localization of the vehicle. Moreover, the accuracy of the electronic map is determined by comparing the ground truth curvature values of the road lane markings to the curve fitting values from the curve fitting of the map trajectory points. The accuracy of the localization of the vehicle 100 is determined by comparing the ground truth curvature values of the trajectory data from the sensor in the GNSS 142 the curvature values of the curve function of the map trajectory points of the electronic map.

Figure 7:
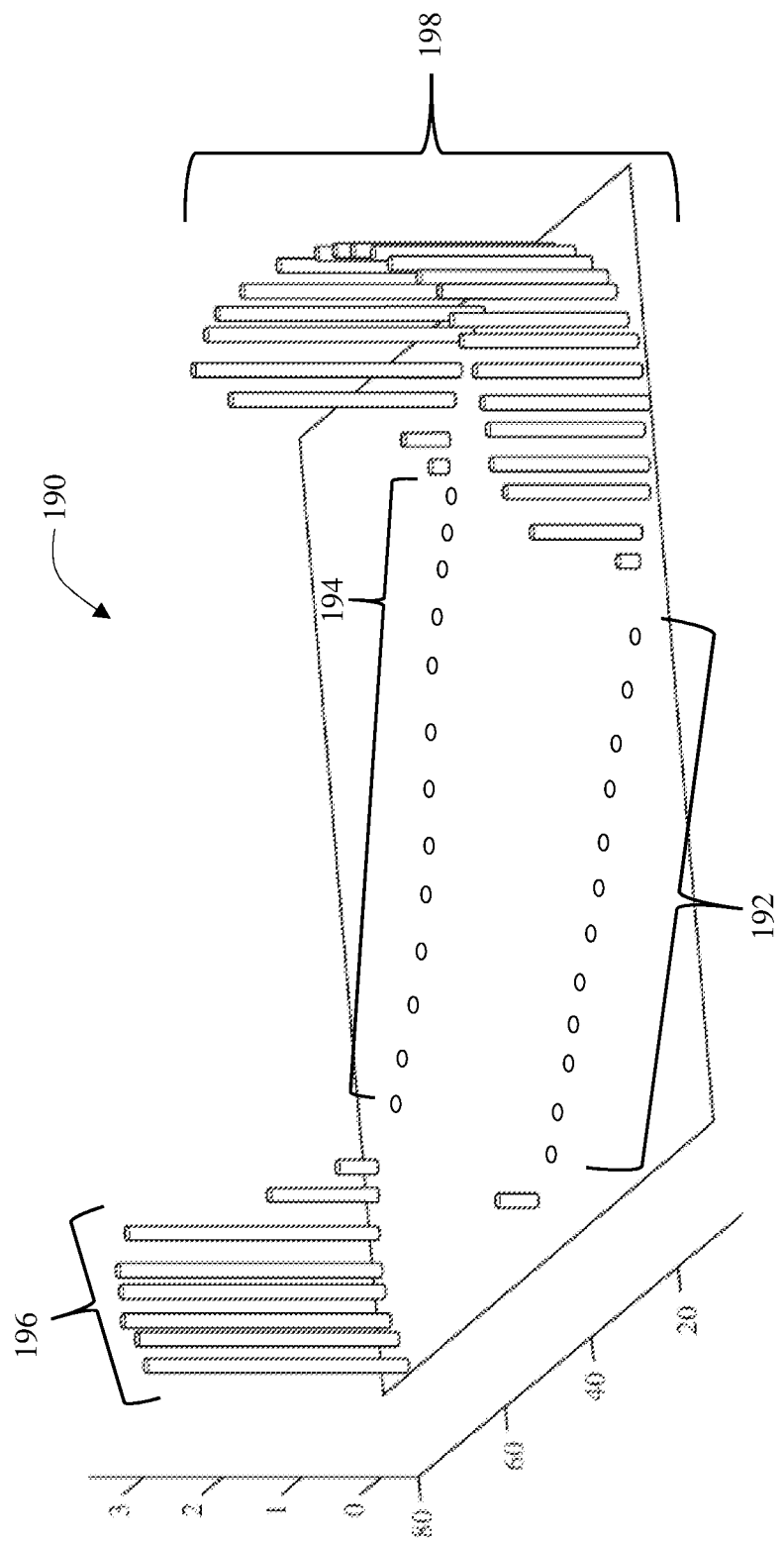
FIG. 7 is a plot illustrating the accuracy of either an electronic map or the localization of a vehicle.

As best shown in FIG. 7, these differences may be plotted in the form of a two-dimensional or three-dimensional plot 190 that shows the location of the vehicle 100 and the accuracy of the electronic map and/or the accuracy of the localization of the vehicle as the location of the vehicle changes. As such, it may be discovered that some portions of the electronic map are fairly accurate, while other portions of the electronic map are inaccurate. In like manner, these plots can illustrate that the localization of the vehicle may be accurate in some locations, but be inaccurate in other locations. Moreover, the plot 190 illustrates the differences as a vehicle travels in an oval. The portions 192 and 194 are the near straightaway portions of the oval and show very little difference. As such, the localization or electronic map at these portions are fairly accurate. However, as the vehicle travels in curve portions, larger differences are discovered, as indicated in portions 196 and 198. As such, in this example, the electronic map or localization of the vehicle less accurate.

Figure 5:
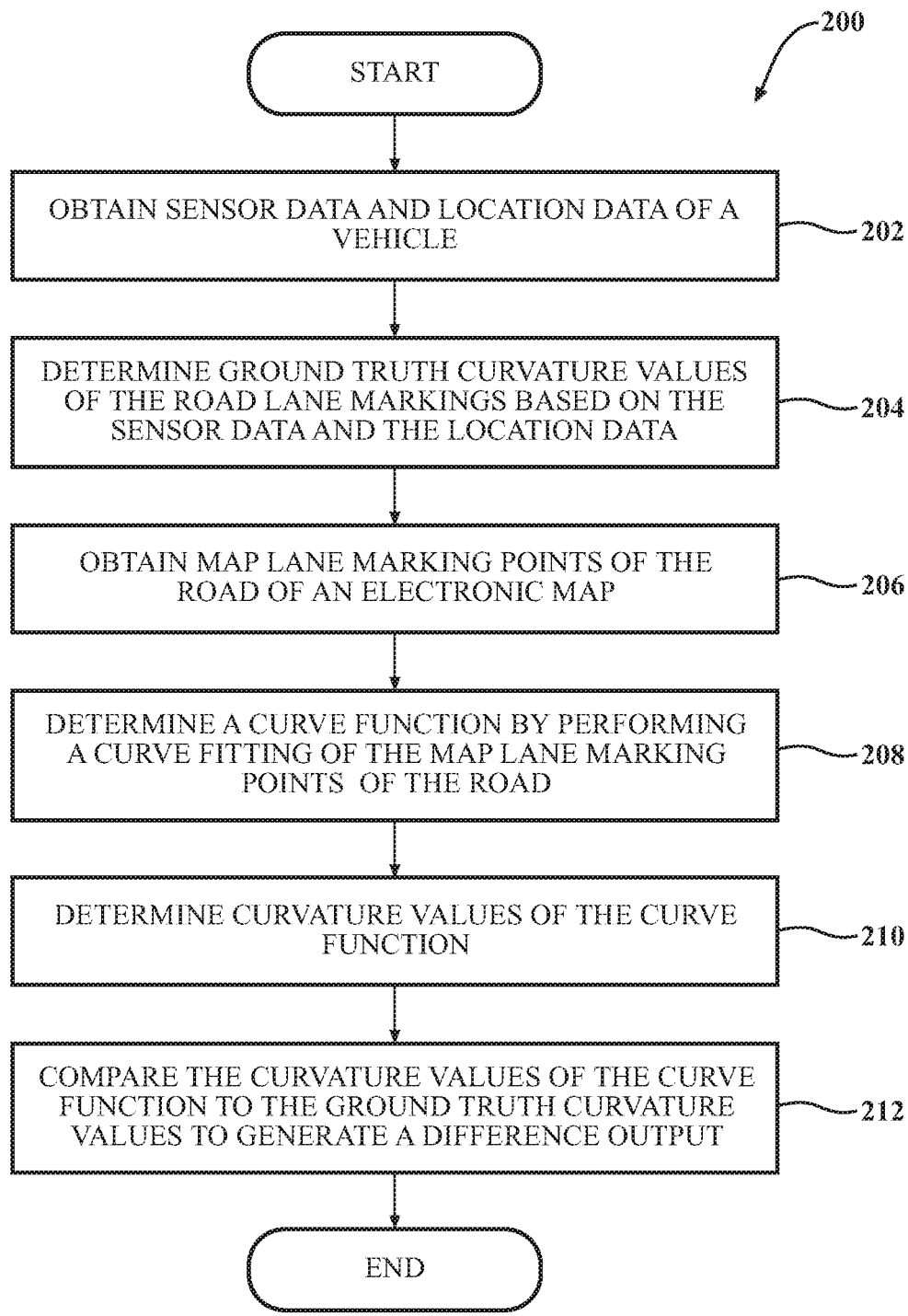
FIG. 5 illustrates a method for determining the accuracy of an electronic map.

Referring to FIG. 5, a method 200 for determining the accuracy of an electronic map is shown. The method 200 will be explained from the perspective of the accuracy measuring system 160 of the vehicle 100. However, the method 200 could be performed by any one of several different devices and is not merely limited to the accuracy measuring system 160 of the vehicle 100. Furthermore, the device performing the method 200 does not need to be incorporated within a vehicle and could be incorporated within other devices as well, such as roadside units, infrastructure, mobile devices, and the like.

The method 200 begins at step 202, wherein the image capture module 182 causes the processor(s) 110 to obtain sensor data and/or location data of the vehicle 100. The sensor data could be in the form of one or more images of road lane marking 14 captured by camera(s) 124. The location data could be in the form of GNSS data captured from the GNSS 140 of the vehicle 100.

In step 204, the ground truth generating module 184 causes the processor(s) 110 to determine ground truth curvature values of the road lane markings 14 based on the sensor data and the location data. Moreover, the road lane markings may be captured in one or more images of the sensor data. In one example, the ground truth curvature values may be determined by first determining initial location values of the road lane markings 14 based on the sensor data and the location data. The initial locations of the road lane markings may then be offset by offset values to generate actual location values. The offset values generally represent the difference between the location of the vehicle 100 and the location of the road lane markings captured by the sensor. Thereafter, the direction values of the actual location values may be calculated by taking a direction derivative of the actual location values. Finally, the ground truth curvature values may be determined by taking the derivative of the direction values.

In step 206, the accuracy determining module 188 may cause the processor(s) 110 to obtain map lane marking points of the road from an electronic map, such as the electronic map stored in the electronic map database 130. In step 208, the curve function generating module 186 causes the processor(s) 110 to determine a curve function by performing a curve fitting of the map lane marking points of the road. It should be mentioned that the map lane marking points of the road obtained from the electronic map should correspond to the road lane markings captured in the sensor data by the sensors. Once the curve function has been performed, the curve values of the curve function could be generated, as indicated in step 210.

At step 212, the accuracy determining module 188 causes the processor(s) 110 to compare the curvature values of the curve function to the corresponding ground truth curvature values to generate a difference output. This difference output indicates the accuracy of the electronic map at different locations. As such, a plot may be generated, indicating the accuracy of the electronic map at different locations.

Figure 6:
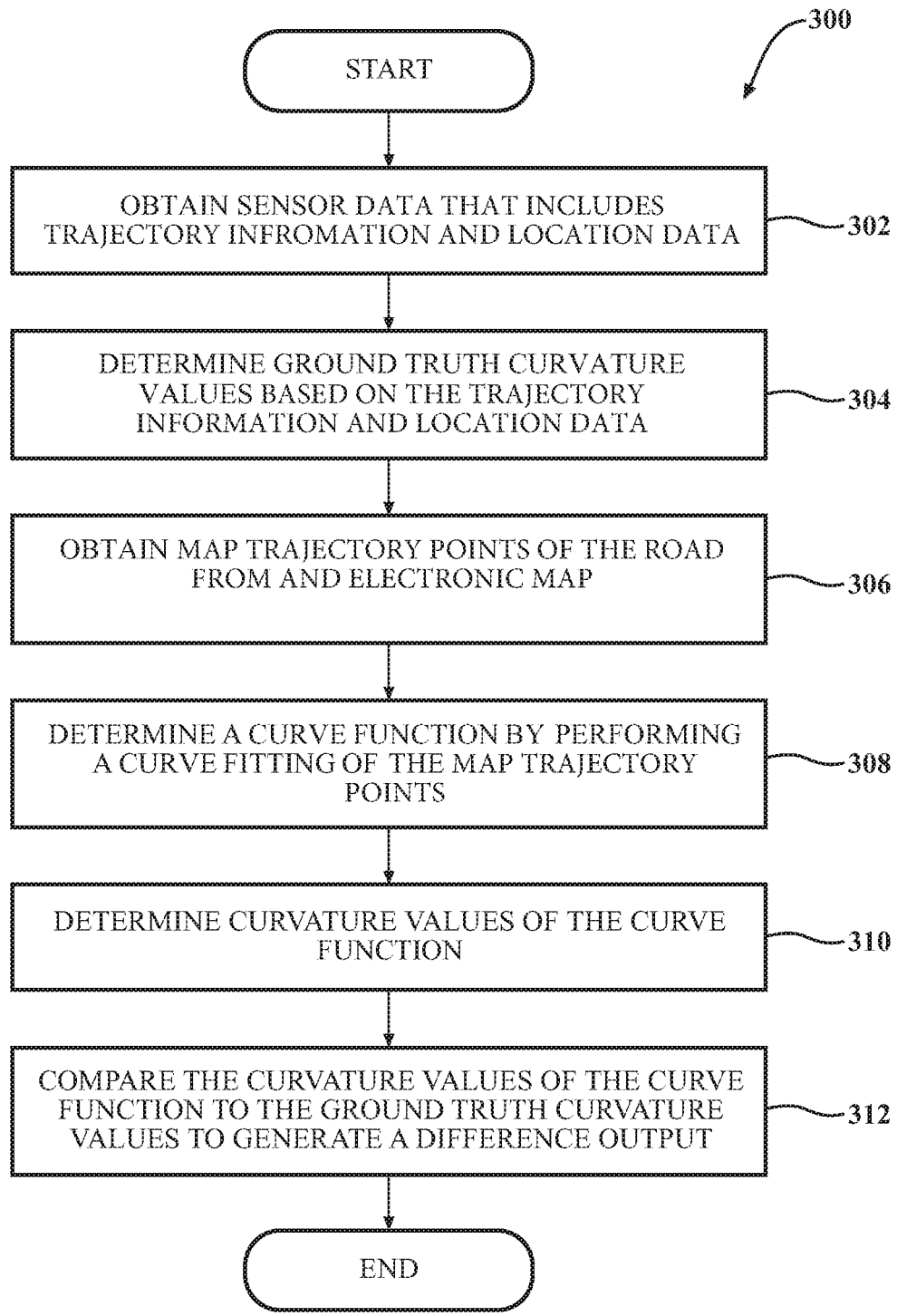
FIG. 6 illustrates a method for determining the accuracy of the localization of a vehicle.

Referring to FIG. 6, a method 300 for determining the accuracy of the localization of a vehicle is shown. The method 300 will be explained from the perspective of the accuracy measuring system 160 of the vehicle 100. However, the method 300 could be performed by any one of several different devices and is not merely limited to the accuracy measuring system 160 of the vehicle 100. Furthermore, the device performing the method 300 does not need to be incorporated within a vehicle and could be incorporated within other devices as well, such as roadside units, infrastructure, mobile devices, and the like.

The method 300 begins at step 302, wherein the image capture module 182 causes the processor(s) 110 to obtain sensor data that includes trajectory information and location data. The sensor data may be in the form of one or more images captured by camera(s) 124. The location data could include location data generated by the GNSS 140. Moreover, the trajectory information regarding the trajectory of the vehicle 100 can be determined by observing one or more objects in one or more images. Using the location of the vehicle 100, as well as the position of one or more objects in the images, the general trajectory of the vehicle 100 can be determined.

In step 304, the ground truth generating module 184 causes the processor(s) 110 to determine ground truth curvature values based on the trajectory information and location data. The trajectory information can be generated by utilizing images captured by the sensors. The images may be of road lane markings that can be utilized to determine the overall trajectory of the vehicle 100 in comparison to the road lane markings.

In one example, the ground truth curvature values could be determined by determining initial location values of lane markers based on the sensor data and offsetting the initial locations of the lane markers by offset values to generate actual location values. The offset values may represent a difference in location between the vehicle 100 and the lane markers. Next, direction values of the actual location values may be determined by taking a direction derivative of the actual location values. Thereafter, the ground truth curvature values can be generated by taking a derivative of the direction values.

In step 306, the accuracy determining module 188 may cause the processor(s) 110 to obtain map trajectory points of the road from the electronic map database 130. It should be noted that the map trajectory points of the road from the electronic map database 130 should generally correspond to any road lane markings captured by the sensors. In step 308, the curve function generating module 186 causes the processor(s) 110 to determine a curve function by performing a curve fitting of the map trajectory points previously obtained in step 306. In step 310, the curve function generating module 186 causes the processor(s) 110 to generate curvature values of the curve function.

In step 312, the accuracy determining module 188 compares the curve values of the curve function to the ground truth curvature values to generate a difference output. This difference output generally indicates the accuracy of the localization of the vehicle 100. The difference output may be plotted in comparison to the location to monitor the accuracy of the location of the vehicle, as the vehicle 100 moves from location to location.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for measuring an accuracy of an electronic map, the method comprising the steps of:
    obtaining sensor data captured by a sensor mounted to a vehicle and location data of the vehicle, wherein the sensor data comprises one or more images of one or more road lane markings of a road;
    determining ground truth curvature values based on the road lane markings from the one or more images of the sensor data and the location data;
    obtaining map lane marking points of the road of the electronic map;
    determining a curve function by performing a curve fitting of the map lane marking points of the road;
    determining curvature values of the curve function; and
    comparing the curvature values of the curve function to the ground truth curvature values to generate a difference output, wherein the difference output indicates the accuracy of the electronic map.

2. The method of claim 1, wherein the curve fitting is a polynomial curve fitting.

3. The method of claim 1, further comprising the step of generating a plot of the difference output.

4. The method of claim 1, wherein the step of determining the ground truth curvature values further comprises the steps of:
    determining initial location values of the lane markers based on the sensor data and the location data; and
    offsetting the initial locations of the road lane markings by offset values to generate actual location values, the offset values representing a difference between the vehicle and the road lane markings.

5. The method of claim 4, wherein the step of determining the ground truth curvature values further comprises the steps of:
    determining direction values of the actual location values by taking a direction derivative of the actual location values; and
    determining ground truth curvature values by taking a derivative of the direction values.

6. The method of claim 1, further comprising the step of converting the map lane marking points of the road of the electronic map to a local coordinate system, wherein the ground truth curvature values are in the local coordinate system.

7. A method for measuring an accuracy of a localization of a vehicle, the method comprising the steps of:
    obtaining sensor data captured by a sensor mounted to a vehicle on a road and location data from a global navigation satellite system (GNSS), wherein the sensor data includes trajectory data regarding a trajectory of the vehicle and the location data includes trajectory points of the vehicle;
    determining initial location values of lane markers based on the sensor data;
    offsetting the initial locations of the lane markers by offset values to generate actual location values, the offset values representing a difference between the vehicle and the lane markers;
    determining direction values of the actual location values by taking a direction derivative of the actual location values;
    determining ground truth curvature values by taking a derivative of the direction values;
    obtaining map trajectory points of the road from an electronic map;
    determining a curve function by performing a curve fitting of the map trajectory points of the road;
    determining curvature values of the curve function; and
    comparing the curvature values of the curve function to the ground truth curvature values to generate a difference output, wherein the difference output indicates the accuracy of the localization of the vehicle.

8. The method of claim 7, further comprising the step converting trajectory points from the GNSS to a map lane point coordinate system of the electronic map.

9. The method of claim 7, wherein the curve fitting is a polynomial curve fitting.

10. The method of claim 7, further comprising the step of generating a plot of the difference output.

11. A system for measuring an accuracy of an electronic map or a localization of a vehicle, the system comprising:
    one or more processors; and
    a memory in communication with the one or more processors, the memory having:
        an image capture module having instructions that when executed by the one or more processors cause the one or more processors to obtain sensor data captured by a sensor mounted to a vehicle and location data of the vehicle, wherein the sensor data includes one or more images of one or more road lane markings of a road,
        a ground truth generating module having instructions that when executed by the one or more processors cause the one or more processors to determine ground truth curvature values based on the road lane markings from the one or more images of the sensor data and the location data,
        a curve function generating module having instructions that when executed by the one or more processors cause the one or more processors to determine a curve function by performing a curve fitting of map lane marking points,
        the curve function generating module having instructions that when executed by the one or more processors cause the one or more processors to determine curvature values of the curve function, and
        an accuracy determining module having instructions that when executed by the one or more processors cause the one or more processors to compare the curvature values of the curve function to the ground truth curvature values to generate a difference output, wherein the difference output indicates the accuracy of at least one of: the electronic map and the localization of the vehicle.

12. The system of claim 11, wherein the curve fitting is a polynomial curve fitting.

13. The system of claim 11, wherein the accuracy determining module further includes instructions that when executed by the one or more processors cause the one or more processors to generate a plot of the difference output.

14. The system of claim 11, wherein the ground truth generating module further comprises instructions that when executed by the one or more processors cause the one or more processors to:
    determine initial location values of the lane markers based on the sensor data and the location data;
    offset the initial locations of the road lane markings by offset values to generate actual location values, the offset values representing a difference between the vehicle and the road lane markings;
    determine direction values of the actual location values by taking a direction derivative of the actual location values; and
    determine ground truth curvature values by taking a derivative of the direction values.

15. The system of claim 11, wherein the ground truth generating module further includes instructions that when executed by the one or more processors cause the one or more processors to convert the map lane marking points of the road of the electronic map to a local coordinate system, wherein the ground truth curvature values are in the local coordinate system.

16. The system of claim 11, wherein the ground truth generating module further comprises instructions that when executed by the one or more processors cause the one or more processors to:
    determine initial location values of lane markers based on the sensor data; and
    offset the initial locations of the lane markers by offset values to generate actual location values, the offset values representing a difference between the vehicle and the lane markers.

17. The system of claim 16, wherein the ground truth generating module further comprises instructions that when executed by the one or more processors cause the one or more processors to:
    determine direction values of the actual location values by taking a direction derivative of the actual location values; and
    determine ground truth curvature values by taking a derivative of the direction values.

18. The system of claim 11, wherein the sensor is one or more cameras and the sensor data is one or more images captured by the one or more cameras.

* * * * *